(12) United States Patent
Lee et al.

(10) Patent No.: US 8,977,189 B2
(45) Date of Patent: Mar. 10, 2015

(54) POWER CONTROL METHOD IN TWO-WAY RELAY NETWORK

(75) Inventors: Yong-Hoon Lee, Daejeon (KR); Yong-Up Jang, Daejeon (KR); Eui-Rim Jeong, Daejeon (KR)

(73) Assignee: KT Corporation, Gyeonggi-do (KR)

( * ) Notice: Subject to any disclaimer, the term of this patent is extended or adjusted under 35 U.S.C. 154(b) by 246 days.

(21) Appl. No.: 13/635,915

(22) PCT Filed: Mar. 18, 2011

(86) PCT No.: PCT/KR2011/001887
§ 371 (c)(1),
(2), (4) Date: Nov. 25, 2012

(87) PCT Pub. No.: WO2011/115450
PCT Pub. Date: Sep. 22, 2011

(65) Prior Publication Data
US 2013/0072113 A1 Mar. 21, 2013

(30) Foreign Application Priority Data
Mar. 19, 2010 (KR) .................. 10-2010-0024857

(51) Int. Cl.
| | |
|---|---|
| *H04B 1/60* | (2006.01) |
| *H04B 17/02* | (2006.01) |
| *H04W 52/22* | (2009.01) |
| *H04B 7/155* | (2006.01) |
| *H04W 52/46* | (2009.01) |

(52) U.S. Cl.
CPC ......... *H04W 52/221* (2013.01); *H04B 7/15535* (2013.01); *H04W 52/46* (2013.01)
USPC ............ 455/9; 455/67.11; 455/509; 370/310; 370/329

(58) Field of Classification Search
USPC .................. 455/9, 67.11, 509, 517, 522, 560; 370/310, 329, 350
See application file for complete search history.

(56) References Cited

U.S. PATENT DOCUMENTS

| | | | |
|---|---|---|---|
| 8,358,712 B2* | 1/2013 | Kim et al. ..................... | 375/260 |
| 8,498,662 B2* | 7/2013 | Kim et al. ..................... | 455/522 |
| 2009/0196367 A1 | 8/2009 | Kim et al. | |
| 2011/0039597 A1 | 2/2011 | Kim et al. | |

FOREIGN PATENT DOCUMENTS

| | | |
|---|---|---|
| KR | 10-2008-0061742 A | 7/2008 |
| KR | 10-2009-0084769 A | 8/2009 |
| KR | 10-2009-0112554 A | 10/2009 |

OTHER PUBLICATIONS

Korean Intellectual Property Office, International Search Report for International Application No. PCT/KR2011/001887, Oct. 31, 2011.
Korean Intellectual Property Office, Written Opinion of the International Searching Authority for International Application No. PCT/KR2011/001887, Oct. 31, 2011.

* cited by examiner

*Primary Examiner* — Tuan H Nguyen
(74) *Attorney, Agent, or Firm* — IP Legal Services, LLC

(57) ABSTRACT

Provided is a method for power control in a two-way relay network. The power control method may maximize a minimum transmission rating and a synthesized transmission rating of the overall system when there are restrictions on the synthesized power of terminals and a repeater in the two-way relay network. The power control method may include determining a power ratio for allocating power to each terminal and a repeater for each subcarrier under restriction on synthesized power of the terminals and the repeater and determining power allocated for each subcarrier according to the determined power ratio.

17 Claims, 3 Drawing Sheets

1

POWER CONTROL METHOD IN TWO-WAY RELAY NETWORK

CROSS REFERENCE TO RELATED APPLICATIONS

This application is a National Stage Patent Application of PCT International Patent Application No. PCT/KR2011/001887 (filed on Mar. 18, 2011) under 35 U.S.C. §371, which claims priority to Korean Patent Application No. 10-2010-0024857 (filed on Mar. 19, 2010), the teachings of which are incorporated herein in their entireties by reference.

TECHNICAL FIELD

The present invention relates to power control in a two-way relay network and, in particular, to power control for maximizing a minimum transmission rating and a synthesized transmission rating of an overall system when the synchronized power of terminals and a repeater is restricted in a two-way relay network where a terminal transmits and receives data through a repeater.

BACKGROUND ART

A typical cellular wireless communication system employs a repeater to improve service quality at a cell edge. Features and functions of such repeater are defined in standard IEEE 802.16j. Such repeater has been frequently utilized in a network in order to improve the performance of a wireless communication system. In addition, the typical cellular wireless communication system employs orthogonal frequency division multiplexing (OFDM) to reduce complexity in a frequency selective channel at a receiving end.

Standards of a portable internet system and a wireless local area network (LAN), such as IEEE 802.16e and 802.16n, select OFDM as standard technology for a physical layer. Accordingly, a wireless communication system may be implemented based on OFDM technology. Therefore, it is worth attempting to increase the performance of the repeater network using the OFDM system and perform the repeater communication.

In a unidirectional repeater protocol, terminals may transmit and receive data through a repeater in four phases. When a unidirectional relay network is configured of a first terminal, a second terminal, and a repeater, data may be transmitted and received through four phases as follows. The first terminal transmits data to the repeater at the first phase and the repeater transmits the received data to the second terminal at the second phase. The second terminal transmits data to the repeater at the third phase. The repeater transmits the received data to the first terminal at the fourth phase.

In order to increase a transmission rating of a typical unidirectional relay network, a two-way repeater protocol has been introduced. When a two-way relay network is configured of a first terminal, a second terminal, and a repeater, data may be transmitted and received in two phases. For example, at the first phase, the first and second terminals simultaneously transmit data to the repeater. At the second phase, the repeater transmits the received data to the first terminal and the second terminal. The first and second terminals may decode data transmitted from other terminal by removing a self-interference signal from the received data. As described, the two-way repeater protocol may increase the synthesized transmission rating about twice much as compared to the unidirectional repeater protocol.

A typical power control method, however, has drawbacks such as power restrictions on terminals and a repeater as well as requiring a complex implementation algorithm.

When the synchronized power of terminals and a repeater is restricted in a two-way relay network, there is a need for developing a power control algorithm for increasing a synthesized transmission rating and a minimum transmission rating of an overall system.

Furthermore, there is a need for developing a power control algorithm having low complexity while considering restriction on the synthesized power of a terminal and a repeater.

DISCLOSURE

Technical Problem

Therefore, the present invention is to solve the problems of the related art as described above and cope with the requirements.

Accordingly, an object of the present invention is to provide a power control method for increasing a synthesized transmission rating and a minimum transmission rating in a two-way relay network.

Particularly, an object of the present invention is to provide a power control method in a two-way relay network for maximizing a synthesized transmission rating and a minimum transmission rating of an overall system when there are restrictions on the synthesized power of terminals and a repeater in the two-way relay network.

The foregoing and other objects, features, aspects and advantages of the present invention will be understood and become more apparent from the following detailed description of the present invention. Also, it can be easily understood that the objects and advantages of the present invention can be realized by the units and combinations thereof recited in the claims.

Technical Solution

In accordance with an embodiment of the present invention, a method may be provided for power control in a two-way relay network having restriction of synthesized power of terminals and a repeater. The method may include estimating a current channel, at each one of the terminals and the repeater, allocating power and determining transmission rating, at each one of the terminals and the repeater, by applying previously determined power control parameters when the estimated current channel is substantially the same as a previous channel, selecting one of a dispersion method and a centralized method as a power control method when the estimated current channel is not the same as the previous channel, allocating power and determining transmission rating, at each one of the terminals and the repeater, by deriving new power control parameters and applying the new power control parameters, when the dispersion method is the selected power control method, and receiving estimated channel information from each one of the terminals and the repeater and deriving new power control parameters at a control unit when the centralized method is the selected power control method and transmitting the new power control parameters to each one of the terminals and the repeater, and allocating power and determining transmission rating at each one of the terminals and the repeater by applying the received power control parameters.

In accordance with another embodiment of the present invention, a method may be provided for power control in a two-way network having restriction of synthesized power of terminals and a repeater. The method may include estimating a current channel, at each one of the terminals and the repeater, allocating power and determining transmission rating, at each one of the terminals and the repeater by applying previously determined power control parameters when the estimated current channel is the same as a previous channel, and allocating and determining power, at each one of the terminals and the repeater by deriving new power control parameters and applying the new power control parameters when the estimated current channel is not the same as a previous channel.

In accordance with still anther embodiment of the present invention, a method may be provided for controlling power under restriction on synthesized power of terminals and a repeater in a two-way relay network. The method may include estimating a current channel by each one of the terminals and the repeater, allocating power and determining transmission rating by each one of the terminals and the repeater by applying previously determined power control parameters when the estimated current channel is substantially the same as a previous channel, and receiving estimated channel information from the terminals and the repeater and deriving new power control parameters by a control unit when the estimated current channel is not the same as the previous channel and transmitting the derived parameters to each one of the terminals and the repeater and allocating power and determining transmission rating at each one of the terminals and the repeater by applying the received power control parameters.

In accordance with yet another embodiment of the present invention, a method may be provided for power control in a two-way relay network. The method may include determining a power ratio denoting a ratio of power allocated to each one of terminals and a repeater in the two-way relay network for each subcarrier under restriction on synthesized power of the terminals and the repeater and determining power to be allocated to each subcarrier according to the determined power ratio.

Advantageous Effects

As set forth above, a power control method in accordance with embodiments of the present invention may maximize the synthesized transmitting rating and the minimum transmission rating in the two-way relay network.

Particularly, the power control method may increase the synthesized transmission rating and the minimum transmission rating of the overall system when there are restrictions on the synthesized power of the terminals and the repeater in the two-way relay network in accordance with embodiments of the present invention.

Furthermore, the power control method may reduce complexity in the two-way relay network while minimizing performance degradation in accordance with embodiments of the present invention. Due to such low complexity, the power control method in accordance with embodiments of the present invention may be implemented as a real-time application.

That is, the power control method in accordance with embodiments of the present invention may have low complexity and may be implemented as a real time application in a two way relay network having restriction on synthesized power. The power control method may largely increase the synthesized transmission rating and the minimum transmission rating through the two phases of power control in accordance with embodiments of the present invention.

BEST MODE

Figure 1:
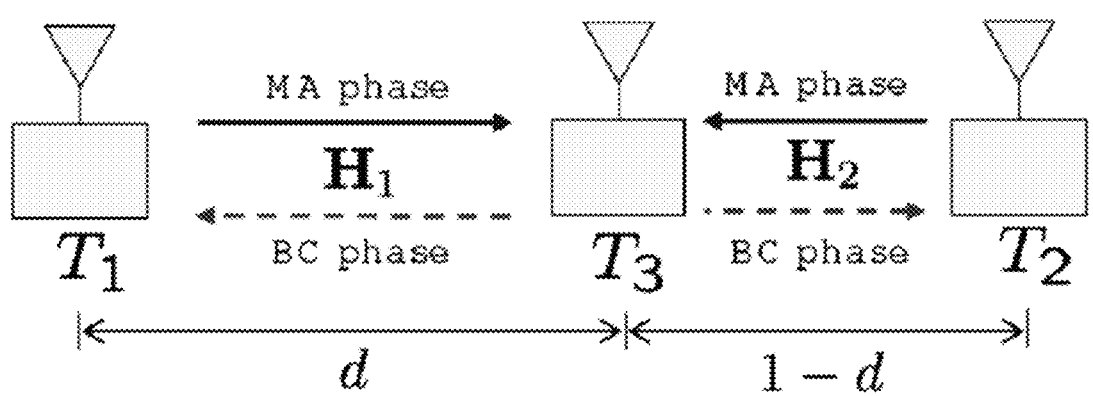
FIG. 1 is an exemplified diagram illustrating a two-way relay network including two terminals that transmit and receive data through a repeater in accordance with embodiments of the present invention.

The foregoing objects, features and advantages will become more apparent from the following description of preferred embodiments of the present invention with reference to accompanying drawings, which are set forth hereinafter. Accordingly, those having ordinary knowledge in the related art to which the present invention pertains will easily embody technical ideas or spirit of the present invention. Further, when technical configurations known in the related art are considered to make the contents obscure in the present invention, the detailed description thereof will be omitted. Hereinafter, exemplary embodiments of the present invention will be described in detail with reference to the accompanying drawings.

A case in which any one part is connected with the other part includes a case in which the parts are directly connected with each other and a case in which the parts are indirectly connected with each other with other elements interposed therebetween. In addition, unless explicitly described otherwise, "comprising" any components will be understood to imply the inclusion of other components but not the exclusion of any other components.

First, a power control method in accordance with embodiments of the present invention will be briefly described as follows.

In accordance with embodiments of the present invention, a relatively optimal power control method and a relatively sub-optimal power control method may be provided for maximizing a synthesized transmission rating and a minimum transmission rating in a two-way relay network including two terminals that transmit and receive data through a repeater. The optimal power control method in accordance with an embodiment of the present invention may have the high complexity. Accordingly, the sub-optimal power control method may be provided for reducing complexity in accordance with another embodiment of the present invention. The sub-optimal power control method may have comparatively low complexity as compared to the optimal power control method while preventing deterioration in performance. Due to the low complexity, the sub-optimal power control method may be applied in real time.

In accordance with embodiments of the present invention, the optimal power control method and the sub-optimal power control method may be implemented by a dispersion method and/or by a centralized method. In the dispersion method, each terminal and a repeater may estimate a channel and perform a power control algorithm so as to control power. In the centralized method, a single control unit may collect channel information, derive power control parameters by performing a power control algorithm, and transmit the power control parameters to each terminal and a repeater. In addition, determination may be made as to whether power control parameters are calculated by each terminal and a repeater (a dispersion method) or by a single control unit (centralized method). According to the determination result, power control may be performed by a corresponding method.

FIG. 1 is a diagram showing a two-way relay network in accordance with embodiments of the present invention.

As shown FIG. 1, the two-way relay network may include a pair of first and second terminals $T_1$ and $T_2$. The first and second terminals $T_1$ and $T_2$ may transmit and receive data through a repeater $T_3$.

FIG. 1 may illustrate an OFDM system having N subcarriers. In the OFDM system of FIG. 1, channels between the first terminal $T_1$ and the repeater $T_3$ and/or between second terminal $T_2$ and the repeater $T_3$ may be defined as a L-tap frequency selective channel $h_k = [h_{k,1}, \ldots, h_{k,L}]$ in a time domain. When the channel in the time domain is mapped to a channel in a frequency domain, the channel may be expressed as a 1-tap channel per each subcarrier. Channels of N subcarriers may be defined as $H_i = \text{diag}\{h_k(1), h_k(N)\}$. Here, diag $\{a\}$ is a diagonal matrix having component of vector a. Furthermore, power allocated to an $n^{th}$ frequency subcarrier of the first and second terminals $T_1$ and $T_2$ and the repeater $T_3$ may be defined as $p_1(n), p_2(n), p_3(n)$, where $n=1, \ldots, N$.

The two-way relay network may operate as follows. The first and second terminals $T_1$ and $T_2$ may simultaneously transmit data to the repeater $T_3$ at a first time slot or a first frequency. This phase may be shown as a Multiple Access (MA) phase in FIG. 1. The repeater $T_3$ may amplify the received signal (data) at a second time slot or a second frequency. The repeater $T_3$ may transmit the amplified signal to first and second terminals $T_1$ and $T_2$, respectively. This phase may be shown as a Broadcast (BC) phase in FIG. 1. As described, each one of first and second terminals receives two overlapping data. Each one of first and second terminals $T_1$ and $T_2$ may remove a self-interference signal from the received data and then decode data transmitted from the other terminal. Accordingly, a pair of terminals may transmit and receive data using two time slots or two frequencies through the repeater as described. After the self-interference signal is removed in the two-way relay network, received first and second signal-to-noise ratios $SNR_1$ and $SNR_2$ of first and second terminal $T_1$ and $T_2$ may be expressed as Equation 1 below.

$$SNR_1(n) = \frac{p_2(n)p_3(n)|h_1(n)|^2|h_2(n)|^2}{p_3(n)|h_1(n)|^2 + p_1(n)|h_1(n)|^2 + p_2(n)|h_2(n)|^2 + 1}$$ [Equation 1]

$$SNR_2(n) = \frac{p_1(n)p_3(n)|h_1(n)|^2|h_2(n)|^2}{p_3(n)|h_2(n)|^2 + p_1(n)|h_1(n)|^2 + p_2(n)|h_2(n)|^2 + 1}$$

In Equation 1, SNR stands for signal-to-noise ratio. When synthesized power is restricted, the synthesized transmission rating may be optimized. Such optimization may be expressed as Equation 2 below based on the received SNR.

Equation 2 may be referred to as an optimization problem of the synthesized transmission rating.

$$\underset{p_k(n) \geq 0, \forall k,n}{\text{maximize}} \; \frac{1}{2} \sum_{n=1}^{N} \sum_{m=1}^{2} \log_2(1 + SNR_m(n))$$ [Equation 2]

$$\text{subject to} \; \sum_{k=1}^{3} \sum_{n=1}^{N} p_k(n) \leq P_T$$

The optimization problem of Equation 2 may be solved as follows. The optimization problem of Equation 2 may be modified to a dual problem using Lagrange theory techniques. The dual problem of the optimization problem of Equation 2 may be expressed as Equation 3 below.

$$\underset{\lambda \geq 0}{\text{minimize}} \left[ \sum_{n=1}^{N} \underset{p_k(n) \geq 0, \forall k}{\max} \left\{ \frac{1}{2} \sum_{m=1}^{2} \log_2(1 + SNR_m(n)) - \lambda \sum_{k=1}^{3} p_k(n) \right\} + \lambda P_T \right]$$ [Equation 3]

In Equation 3, $\lambda$ represents a Lagrange multiplier. The dual problem presented in Equation 3 may be solved as follows. For any Lagrangian multiplier value $\lambda$, the dual problem Equation 3 may be decomposed into the N number of equations (represented as Equation 4) where N corresponds to each subcarrier.

$$\underset{p_k(n) \geq 0, \forall k}{\max} \left\{ \frac{1}{2} \sum_{m=1}^{2} \log_2(1 + SNR_m(n)) - \lambda \sum_{k=1}^{3} p_k(n) \right\}$$ [Equation 4]

After a solution for Equation 4 is calculated for each subcarrier, $\lambda$ may be updated by a subgradient method. Particularly, $\lambda$ may be updated by repeating the calculation and update process until the value for $\lambda$ converges. After solutions for the N (Equation 4)s are obtained, an amount of power to be allocated to the first and second terminals $T_1$ and $T_2$ and the repeater $T_3$, may be calculated using the converged value for $\lambda$. The power may be expressed as power $p_k(n)$ where $k=1, 2, 3$.

In order to obtain the optimal solutions of N (Equation 4)s, a search in a three-dimensional space in a discrete power unit may be required because Equation 4 is non-convex for $p_k(n)$ where $k=1, 2, 3$. For example, when an allocable discrete power unit is $\Delta$ and an allocable maximum power $p_{k,max}$, $k=1, 2, 3$, $p_k(n) \in \{0, \Delta, 2\Delta, \ldots, p_{k,max}\}$, a complexity of obtaining a solution of Equation 2 is $O(INB^3)$, where I represent the repetition of updating $\lambda$ and B represents the number of possible discrete power units. Equation 2 is the given maximization problem of the synthesized transmission rating. As described above, in the process of calculating $p_1(n), p_2(n), p_3(n)$, where $n=1, \ldots, N$, the process of optimizing Equation 4 in the discrete power unit may have the complexity of $B^3$.

In accordance with embodiments of the invention, the original optimization problem Equation 2 may be solved by the following two steps in order to reduce the complexity of an optimal power control method. Such method in accordance with embodiments of the present invention may be referred to as a suboptimal power control method. At the first step, a power ratio may be determined. That is, power is allocated to each one of the first and second terminals and the repeater for each subcarrier while the synthesized power of the first and second terminals $T_1$ and $T_2$ and the repeater $T_3$ is restricted. A ratio of such power may be determined at the first step. In order to allocate power to the first and second terminals $T_1$ and $T_2$ and the repeater $T_3$ for each subcarrier, Equation 5 below may be defined at the first step.

$$\underset{p_k(n)\geq 0,\forall k}{\text{maximize}}\frac{1}{2}\sum_{m=1}^{2} \log_2(1+SNR_m(n)) \qquad \text{[Equation 5]}$$

$$\text{subject to } \sum_{k=1}^{3} p_k(n) = P_T(n)$$

Equation 5 might be employed to obtain a solution of $p_1$ (n), $p_2$ (n), and $p_3$ (n) for maximizing the synthesized transmission rating when the synthesized power in an $n^{th}$ subcarrier is $P_T$ (n). Equation 6 below shows a relatively optimal solution for the Equation 5. As shown in Equation 6, Equation 5 may have a closed solution.

$$p_1^o(n) = \frac{P_T(n)(1+|h_2(n)|^2 P_T(n))}{2\left(\begin{array}{c}1+|h_2(n)|^2 P_T(n)+\\ \sqrt{(1+|h_1(n)|^2 P_T(n))(1+|h_2(n)|^2 P_T(n))}\end{array}\right)}, \qquad \text{[Equation 6]}$$

$$p_2^o(n) = \frac{P_T(n)\sqrt{(1+|h_1(n)|^2 P_T(n))(1+|h_2(n)|^2 P_T(n))}}{2\left(\begin{array}{c}1+|h_2(n)|^2 P_T(n)+\\ \sqrt{(1+|h_1(n)|^2 P_T(n))(1+|h_2(n)|^2 P_T(n))}\end{array}\right)},$$

$$p_3^o(n) = \frac{P_T(n)}{2}.$$

When the optimal solution of Equation 6 is substituted into $SNR_1$ (n) and $SNR_2$ (n) of Equation 1, $SNR_1$ (n)=$SNR_2$ (n). $SNR^O$ (n)=$SNR_1$ (n)=$SNR_2$ (n) may be expressed as Equation 7 below.

$$SNR^o(n) = \frac{1}{2}\left(\frac{|h_1(n)|^2|h_2(n)|^2 P_T^2(n)}{2+|h_1(n)|^2 P_T(n)+|h_2(n)|^2 P_T(n)+\\ 2\sqrt{(1+|h_1(n)|^2 P_T(n))(1+|h_2(n)|^2 P_T(n))}}\right) \qquad \text{[Equation 7]}$$

Optimal solutions derived from Equation 6 and Equation 7 may have the following features. The derived closed solution may make the received $SNR_1$ (n) to be equal to $SNR_2$ (n) ($SNR_1$ (n)=$SNR_2$ (n)) by allocating a half of a total power $P_T$ (n) to the repeater $T_3$ and allocating the remaining half power to the terminals $T_1$ and $T_2$. Here, $P_T$ (n) may denote total power allocated to the $n^{th}$ subcarrier. That is, an optimal method may be allocating power to balance the SNR. Accordingly, the optimal method may be maximization of the synthesized transmission rating of Equation 5 which is the same as maximizing a minimum transmission rating. The minimum transmission rating may be expressed as min {$\log_2$ (1+$SNR_1$ (n)), $\log_2$ (1+$SNR_2$ (n))}. A solution of the maximization of the minimum transmission rating may be control of power to make two transmission ratings, such as $\log_2$ (1+$SNR_1$ (n)) and $\log_2$ (1+$SNR_2$ (n)), to be equal. Furthermore, the optimal solution of Equation 6 may be control of power to make the received SNRs to be equal to each other and maximizing the received SNR. Accordingly, the optimal solution of Equation 6 may be maximization of the minimum transmission rating.

At the second step, power to be allocated to each subcarrier may be determined according to the power ratio determined at the first step. That is, at the second step, the synthesized transmission rating may be maximized using $SNR^O$ (n) while satisfying the total synthesized power. The maximization of the synthesized transmission rating may be expressed as Equation 8 below.

$$\underset{P_T(n)\geq 0,\forall n}{\text{maximize}}\sum_{n=1}^{N} \log_2(1+SNR^o(n)) \qquad \text{[Equation 8]}$$

$$\text{subject to } \sum_{n=1}^{N} P_T(n) \leq P_T$$

Similar to solving Equation 2, Equation 8 may be modified to Equation 9 below in order to solve Equation 8. The modification to Equation 9 may be to form the Lagrange dual problem.

$$\underset{\lambda \geq 0}{\text{minimize}} \qquad \text{[Equation 9]}$$

$$\left[\sum_{n=1}^{N} \underset{P_T(n)\geq 0,\forall k}{\text{max}} \{\log_2(1+SNR^o(n)) - \lambda P_T(n)\} + \lambda P_T\right]$$

The solution of Equation 9 may be obtained through the same method for obtaining the solution of Equation 3. For example, an initial Lagrangian multiplier value λ may be obtained by calculating N (Equation 10)s. Then, the λ may be updated using a subgradient method with $P_T$ (n) where n=1, N.

$$\underset{P_T(n)\geq 0,\forall k}{\text{max}} \{\log_2(1+SNR^o(n)) - \lambda P_T(n)\} \qquad \text{[Equation 10]}$$

Using Equation 10, the optimal solution may be obtained with less complexity as compared with Equation 4. Since the $SNR^O$ (n) value of Equation 7 may be a convex function for the $P_T$ (n), Equation 10 is also the convex optimization problem. Accordingly, the optimal solution of Equation 10 may be obtained using a golden section method which is a method for solving the convex optimization problem. That is, the optimal solution of Equation 10 may be obtained with complexity of log(B). Here, B is the number of discrete power units of the $P_T$ (n). Therefore, the complexity of solving Equation 10 may be O (lN log(B)). As descried, the suboptimal power control method in accordance with embodiments of the present invention may control power with relatively low complexity using Equation 3.

The power control method in accordance with embodiments of the present invention may include two major schemes according to the availability and complexity of the system.

The first scheme may be a dispersion scheme. In the first scheme, each one of terminals and a repeater may individually perform the power control algorithm in accordance with embodiments of the present invention. For example, terminals and a repeater are distributed in a network and each one of the terminals and a repeater may estimate a channel between one terminal and the repeater. Each one of the terminals and the repeater may perform the power control algorithm in accordance with embodiments of the present invention based on the estimated channel parameters. Each one of the terminals and the repeater may allocate power by applying the obtained power control parameters and determine transmission rating. Based on the allocated power and the determined transmission rating, each one of the terminals and the repeater may communicate with each other through two-way relay communication.

When processing power and complexity of the terminals and the repeater are insufficient to perform the power control algorithm in accordance with embodiments of the present invention, the second scheme of the power control method may be performed. The second scheme may be a centralized scheme. In the second scheme, single control unit (not shown) may collect information of channels estimated from the terminals and the repeater. The control unit may obtain power control parameters by performing the power control algorithm in accordance with embodiments of the present invention. The controller may transmit the power control parameter to the terminals and the repeater. The terminals and the repeater may allocate power and determine transmission rating using the received power control parameters. Based on the allocated power and the determined transmission rating, the terminals and the repeater may perform the two-way repeater communication. For example, the controller may be implemented in the repeater. The present invention, however, is not limited thereto. The controller may be implemented in a base station that communicates with the repeater and the terminals in accordance with another embodiment of the present invention.

Figure 2:
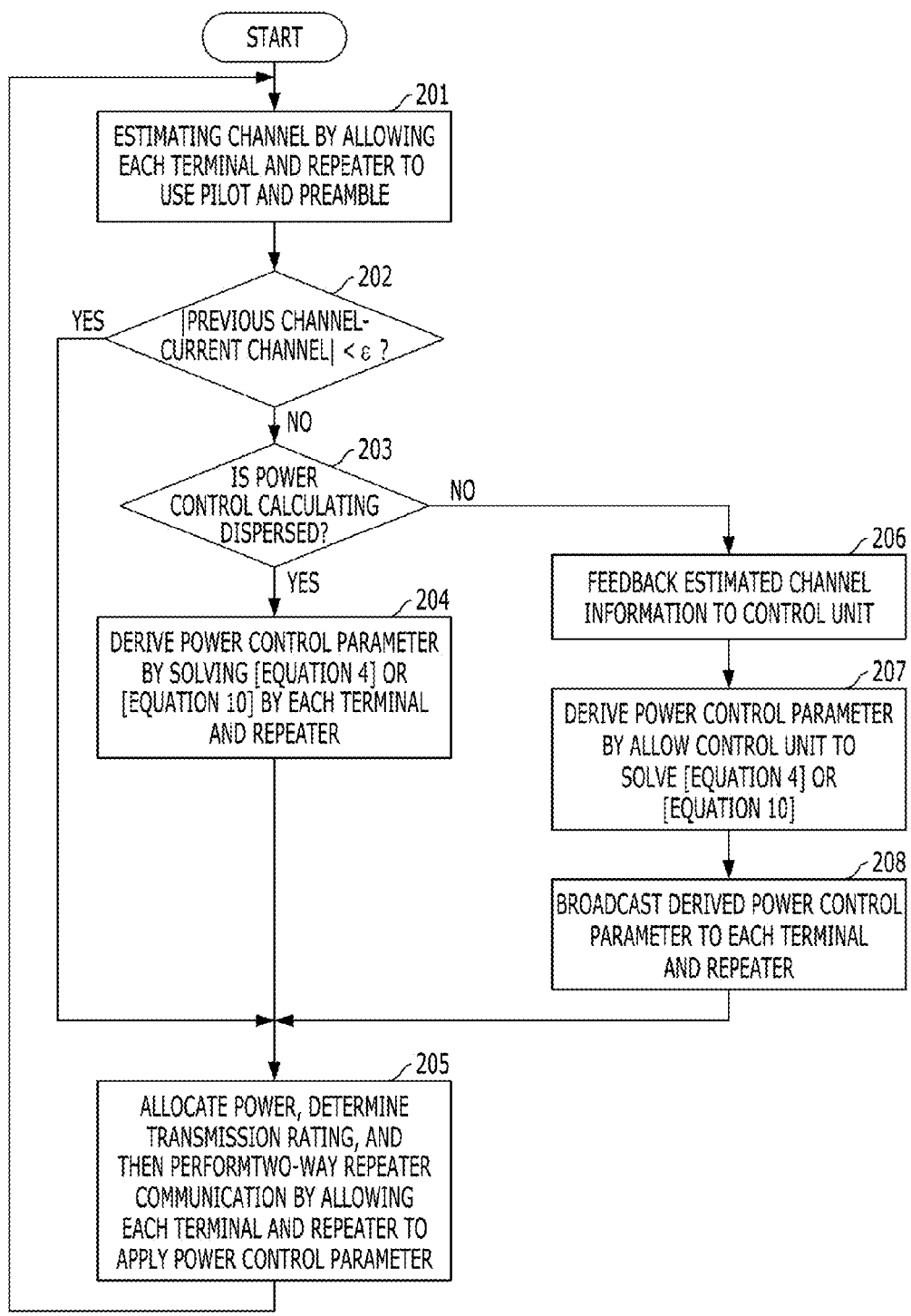
FIG. 2 is a flowchart of a power control method in a two-way relay network having restriction on synthesized power of terminals and a repeater in accordance with embodiments of the present invention.

FIG. 2 is a flowchart showing a power control method in a two-way relay network in accordance with embodiments of the present invention.

At step S201, each one of terminals and a repeater may estimate a channel using a pilot signal or a preamble signal.

At step S202, each one of the terminal and the repeater determine whether a previous channel is relatively nearly identical to a current channel (|current channel−previous channel|<ϵ). For example, the previous channel may be estimated using a pilot signal or a preamble of a previous time slot. Such the previously estimated channel may be compared with the currently estimated channel.

When the previous channel is about identical to the current channel (|current channel−previous channel|<ϵ: Yes—S202), each one of the terminal and the repeater allocate (control) power based on previously power control parameters, determine a transmission rating, and perform the two-way repeater communication at step S205.

When the previous channel is not identical to the current channel (|current channel−previous channel|>ϵ: No—S202), determination may be made as to whether power control method is performed using the dispersion scheme or using the centralized scheme at step S203.

When the dispersion scheme is used (Yes—S203), each one of the terminals and the repeater obtain a new power control parameter using one of Equation 4 and Equation 10 at step S204. Particularly, when Equation 4 is used to obtain the new power control parameters, the power control method may become an optimal power control method. When Equation 10 is used to obtain the new power control parameters, the power control method may become the sub-optimal power control method.

At step S205, power may be allocated and transmission rating may be determined based on the power control parameters obtained at the step S204 and two-way relay communication may be performed based on the allocated power and the determined transmission rating.

When the dispersion scheme is not used (No—S203), each one of the terminals and the repeater may transmit the estimated channel information to the control unit at step S206. At step S207, the control unit may obtain new power control parameters using one of Equation 4 and Equation 10. When Equation 4 is used for obtaining the new power control parameters, the power control method may become the optimal power control method. When Equation 10 is used for obtaining the new power control parameters, the power control method may become the sub-optimal power control method.

At step S208, the obtained power control parameters of the step S207 may be transmitted to each one of the terminals and the repeater. At step S205, each one of the terminals and the repeater may allocate power and determine transmission rating by applying the received power control parameters and perform two-way relay communication based on the allocated power and the determined transmission rating.

As described, one of the dispersion method and the centralized method may be selected and the power control method may be performed through the selected method in accordance with embodiments of the present invention. In the dispersion method, each one of the terminals and the repeater may individually obtain power control parameters. In the centralized method, single control unit may obtain power control parameters. The optimal power control method and the sub-optimal power control method in accordance with embodiments of the present invention may be implemented as the dispersion method and as the centralized method. In the dispersion method, each one of the terminals and the repeater may estimate the channel and perform the power control algorithm. In the centralized method, the single control unit may collect channel information, obtain power control parameters by performing a power control algorithm, and transmit the obtained power control parameters to each one of the terminals and the repeater in order to enable the terminals and the repeater to perform control power.

Figure 3:
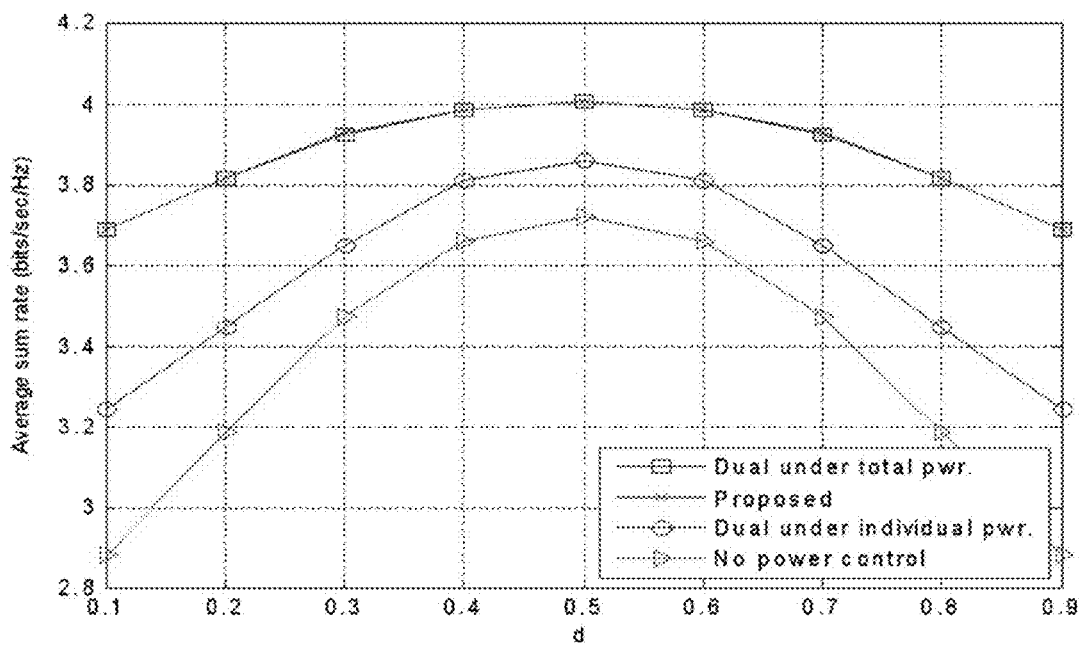
FIG. 3 is a graph illustrating an analysis of power control methods based on a mean synthesized transmission rating in a two-way relay network in accordance with embodiments of the present invention.
Figure 4:
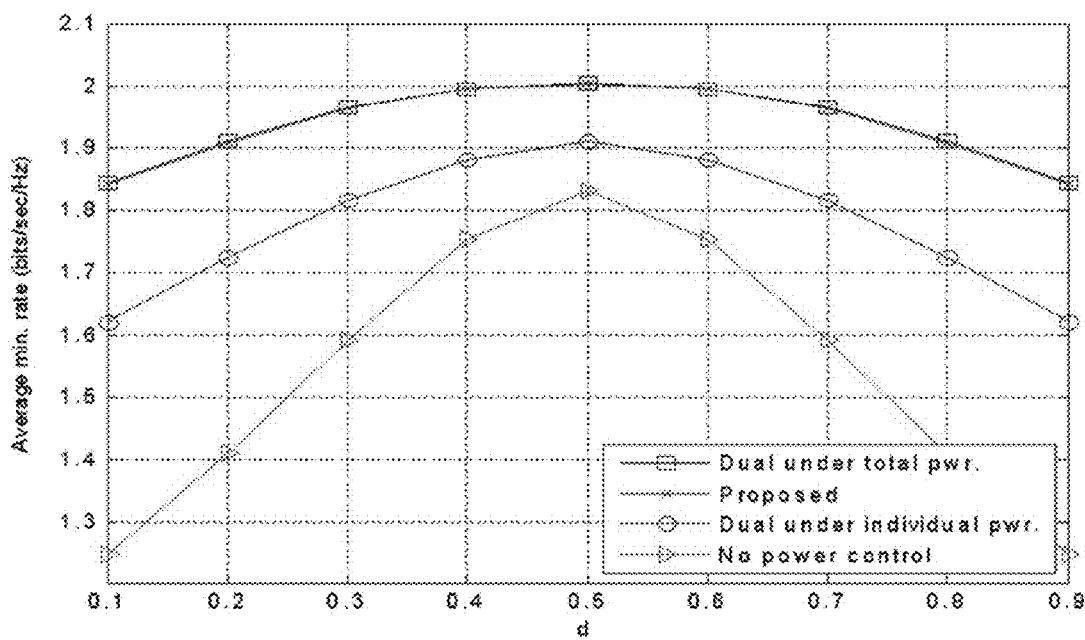
FIG. 4 is a graph illustrating an analysis of power control methods based on a mean minimum transmission rating in a two-way relay network in accordance with embodiments of the present invention.

FIG. 3 is a graph showing an analysis of a power control method based on average synthesized transmission rating in a two-way relay network in accordance with embodiments of the present invention. FIG. 4 is a graph showing an analysis of a power control method based on average minimum transmission rating in a two-way relay network in accordance with embodiments of the present invention.

The performance of the power control method in accordance with the present invention is compared with typical power control methods for evaluation. As shown in FIG. 3 and FIG. 4, the relative performances of the optimal power control method (dual under total pwr.) and the sub-optimal power control method (proposed) are compared with the typical power control methods (Dual under individual pwr) and (no power control). The typical optimal power control method (dual under individual pwr.) may have the high complexity for maximizing the synthesized transmission rating and the minimum transmission rating under the restriction on power of each one of the terminals and the repeater. The typical method (no power control) may allocate the same power to each sub-carrier without power control.

Further, examples of a two-way network having the same configuration of FIG. 1 and the performance of the power control methods are compared based on the synthesized transmission rating and the minimum transmission rating while changing a distance d between the terminal $T_1$ and the repeater $T_3$. Also for the examples, the channels between the terminals and the repeater are the frequency selective channel having 8-tap and the taps of each channel has the same power. Accordingly, the distribution of each channel tap may be $h_{1,t} \sim Cn(0, 1/8/d^\gamma)$ and $h_{2,t} \sim CN(0, 1/8/(1-d)^\gamma)$. Here, γ may denote a path loss exponent and it is assumed that γ is 3 in the performance evaluation. Furthermore, the number N of sub-carriers in the OFDM frequency domain is 64 in the examples. In addition, the restriction $P_T$ on power of the overall system is 30 N and $p_k(n)=\{0, 0.5, 30\}$ and $P_T(n)=\{0, 0.5, 1, 1.5, 90\}$ as the discrete power.

The graphs of FIG. 3 and FIG. 4 show the average synthesized transmission rating and the average minimum transmission rating. The graphs of FIGS. 3 and 4 may show that the sub-optimal power control method (Proposed) in accordance with the present invention may have higher gain as compared with the optimal power control method (dual under individual pwr.). For example, when d=0.1, the sub-optimal power control method (Proposed) may have about 14% of the gain in the mean synthesized transmission rating and the minimum transmission rating as compared with the typical power control method (dual under individual pwr). For example, when d=0.5, the sub-optimal power control method (proposed) may have about 5% of gain in the mean synthesized transmission rating and the minimum transmission rating as compared with the typical power control method (dual under individual pwr).

In addition, when d=0.1, the sub-optimal power control method in accordance with embodiments of the present invention may have about 28% of gain in the average synthesized transmission rating and the minimum transmission rating as compared with the typical system allocating the same power to each subcarrier (no power control). Furthermore, when d=0.5, the sub-optimal power control method in accordance with embodiments of the present invention may have about 9% of gain in the average synthesized transmission rating and the minimum transmission rating as compared with the typical system (no power control). The graphs of FIG. 3 and FIG. 4 also show that the sub-optimal power control method (Proposed) with the low complexity and the optimal power control method (dual under total pwr.) with the high complexity may have about the same performance.

The power control method in the two-way relay network in accordance with the present invention as described above may be implemented as a program command type that can be executed through various computer means and may be recorded in a computer readable medium. The computer readable medium may include program commands, data fields, a data structure, and the like, alone or a combination thereof. The program commands recorded in the medium is specially designed and configured for the present invention or may be used by being known to those skilled in the art of computer software. An example of the computer readable recording medium may include magnetic media such as hard disk, floppy disk, magnetic tape, and the like, optical media such as CD-ROM, DVD, and the like, magneto-optical media such as floppy or optical disk, and hardware devices specially configured to store and perform program commands such as ROM, RAM, flash memory, and the like. The medium may be a transmission medium such as light, a metal line, a waveguide, and the like, including a carrier transmitting a signal designating a program command, data architecture, and the like. An example of the program commands may include a machine language code made by a compiler and a high-level language code executable by a computer using an interpreter, and the like. The above-mentioned hardware devices may be configured to be operated as at least one software module so as to perform an operation of the present invention, and vice versa.

As described above, although the present invention is described by the limited embodiments and drawings, the present invention is not limited to the above-described. Various forms of substitutions, modifications and alterations may be made by those skilled in the art from the above description without departing from the spirit of the prevent invention.

Accordingly, the scope of the present invention is not construed as being limited to the described embodiments but is defined by the appended claims as well as equivalents thereto.

INDUSTRIAL APPLICABILITY

The power control method in accordance with embodiments of the present invention may improve the system capacity in the two-way relay network such as the portable Internet system and the like.

The invention claimed is:
1. A method for controlling power under restriction on synthesized power of terminals and a repeater in a two-way relay network the method comprising:
estimating a current channel, at each one of the terminals and the repeater;
allocating power and determining a transmission rating, at each one of the terminals and the repeater, by applying previously determined power control parameters when the estimated current channel is substantially the same as a previous channel;
selecting one of a dispersion method and a centralized method as a power control method when the estimated current channel is not the same as the previous channel;
allocating power and determining a transmission rating, at each one of the terminals and the repeater, by deriving new power control parameters and applying the new power control parameters, when the dispersion method is the selected power control method; and
receiving estimated channel information from each one of the terminals and the repeater and deriving new power control parameters at a control unit when the centralized method is the selected power control method and transmitting the new power control parameters to each one of the terminals and the repeater, and allocating power and determining a transmission rating at each one of the terminals and the repeater by applying the received power control parameters.

2. The method of claim 1, wherein the deriving of the new power control parameters includes:
determining a power ratio denoting a ratio of power to be allocated to each one of the terminals and the repeater for each subcarrier under the restriction on the synthesized power of the terminals and the repeater; and
determining power to be allocated to each subcarrier according to the determined power ratio.

3. The method of claim 1, wherein the deriving of the new power control parameters including deriving the new power control parameters using equation:

$$\max_{P_T(n) \geq 0, \forall k} \{\log_2(1 + SNR^o(n)) - \lambda P_T(n)\},$$

wherein λ represents a Lagrange multiplier and $P_T(n)$ represents the synthesized power in an $n^{th}$ subcarrier.

4. The method of claim 1, wherein the deriving of the new power control parameters includes deriving the new power control parameters using equation:

$$\max_{p_k(n)\geq 0, \forall k} \left\{ \frac{1}{2} \sum_{m=1}^{2} \log_2(1 + SNR_m(n)) - \lambda \sum_{k=1}^{3} p_k(n) \right\},$$

wherein λ represents a Lagrange multiplier and $p_k$ (n) represents power allocated to each terminal and the repeater.

5. A method for controlling power under restriction on synthesized power of terminals and a repeater in a two-way relay network the method comprising:
estimating a current channel, at each one of the terminals and the repeater;
allocating power and determining a transmission rating, at each one of the terminals and the repeater by applying previously determined power control parameters when the estimated current channel is the same as a previous channel; and
allocating and determining power, at each one of the terminals and the repeater by deriving new power control parameters and applying the new power control parameters when the estimated current channel is not the same as a previous channel.

6. The method of claim 5, wherein the deriving of the new power control parameters includes:
determining a power ratio denoting a ratio of power to be allocated to each one of the terminals and the repeater for each subcarrier under the restriction on the synthesized power of the terminals and the repeater; and
determining power to be allocated to each subcarrier according to the determined power ratio.

7. The method of claim 5, wherein the deriving of the new power control parameters including deriving the new power control parameters using equation:

$$\max_{P_T(n)\geq 0, \forall k} \{\log_2(1 + SNR^o(n)) - \lambda P_T(n)\},$$

wherein λ represents a Lagrange multiplier and $P_T$ (n) represents the synthesized power in an $n^{th}$ subcarrier.

8. The method of claim 5, wherein the deriving of the new power control parameters includes deriving the new power control parameters using equation:

$$\max_{p_k(n)\geq 0, \forall k} \left\{ \frac{1}{2} \sum_{m=1}^{2} \log_2(1 + SNR_m(n)) - \lambda \sum_{k=1}^{3} p_k(n) \right\},$$

wherein λ represents a Lagrange multiplier and $p_k$ (n) represents power allocated to each terminal and the repeater.

9. A method for controlling power under restriction on synthesized power of terminals and a repeater in a two-way relay network, the method comprising:
estimating a current channel by each one of the terminals and the repeater;
allocating power and determining transmission rating by each one of the terminals and the repeater by applying previously determined power control parameters when the estimated current channel is substantially the same as a previous channel; and
receiving estimated channel information from the terminals and the repeater and deriving new power control parameters by a control unit when the estimated current channel is not the same as the previous channel and transmitting the derived parameters to each one of the terminals and the repeater and allocating power and determining transmission rating at each one of the terminals and the repeater by applying the received power control parameters.

10. The method of claim 9, wherein the deriving of the new power control parameters includes:
determining a power ratio denoting a ratio of power to be allocated to each one of the terminals and the repeater for each subcarrier under the restriction on the synthesized power of the terminals and the repeater; and
determining power to be allocated to each subcarrier according to the determined power ratio.

11. The method of claim 9, wherein the deriving of the new power control parameters including deriving the new power control parameters using equation:

$$\max_{P_T(n)\geq 0, \forall k} \{\log_2(1 + SNR^o(n)) - \lambda P_T(n)\},$$

wherein λ represents a Lagrange multiplier and $P_T$ (n) represents the synthesized power in an $n^{th}$ subcarrier.

12. The method of claim 9, wherein the deriving of the new power control parameters includes deriving the new power control parameters using equation:

$$\max_{p_k(n)\geq 0, \forall k} \left\{ \frac{1}{2} \sum_{m=1}^{2} \log_2(1 + SNR_m(n)) - \lambda \sum_{k=1}^{3} p_k(n) \right\},$$

wherein λ represents a Lagrange multiplier and $p_k$ (n) represents power allocated to each terminal and the repeater.

13. A power control method for, by a control unit, deriving a power control parameters based on estimated channel information received from terminals and a repeater in order to control power under restriction on synthesized power of the terminals and the repeater in a two-way relay network, the method comprising:
determining, by the control unit, a power ratio denoting a ratio of power allocated to each one of the terminals and the repeater in the two-way relay network for each subcarrier under restriction on synthesized power of the terminals and the repeater; and
determining, by the control unit, power to be allocated to each subcarrier according to the determined power ratio.

14. A device for controlling power under restriction on synthesized power in a two-way relay network, the device configured to: calculate power control parameters for allocating power and determining a transmission rating using at least one of equations:

$$\max_{P_T(n)\geq 0, \forall k} \{\log_2(1 + SNR^o(n)) - \lambda P_T(n)\}; \text{ and}$$

$$\max_{p_k(n)\geq 0, \forall k} \left\{ \frac{1}{2} \sum_{m=1}^{2} \log_2(1 + SNR_m(n)) - \lambda \sum_{k=1}^{3} p_k(n) \right\}$$

wherein λ represents a Lagrange multiplier, PT (n) represents the synthesized power in an $n^{th}$ subcarrier, pk (n) represents power allocated to each terminal and a repeater, k denotes an index of each terminal or the repeater, m denotes an index of each terminal and the repeater, n denotes an index of a subcarrier, $SNR^o$ denotes an optimal solution of SNR m(n), and SNR m(n) denotes a signal to noise ratio of a $n^{th}$ subcarrier of a $m^{th}$ terminal or a $m^{th}$ repeater.

15. The device of claim 14, wherein when a dispersion method is used as a power control method, the device is at least one of terminals and a repeater in the two-way relay network and the device is configured to allocate power and determine a transmission rating based on the calculated power control parameter.

16. The device of claim 14, wherein when a centralized method is used as a power control method, the device is a control unit in the two-way relay network.

17. The device of claim 16, wherein the device is configured to receive estimated channel information from each one of terminals and a repeater in the two-way relay network, to calculate the power control parameters based on the received estimated channel information, and to transmit the calculated power control parameters to each one of the terminals and the repeater.

* * * * *